T. F. SEARLES 3,349,477

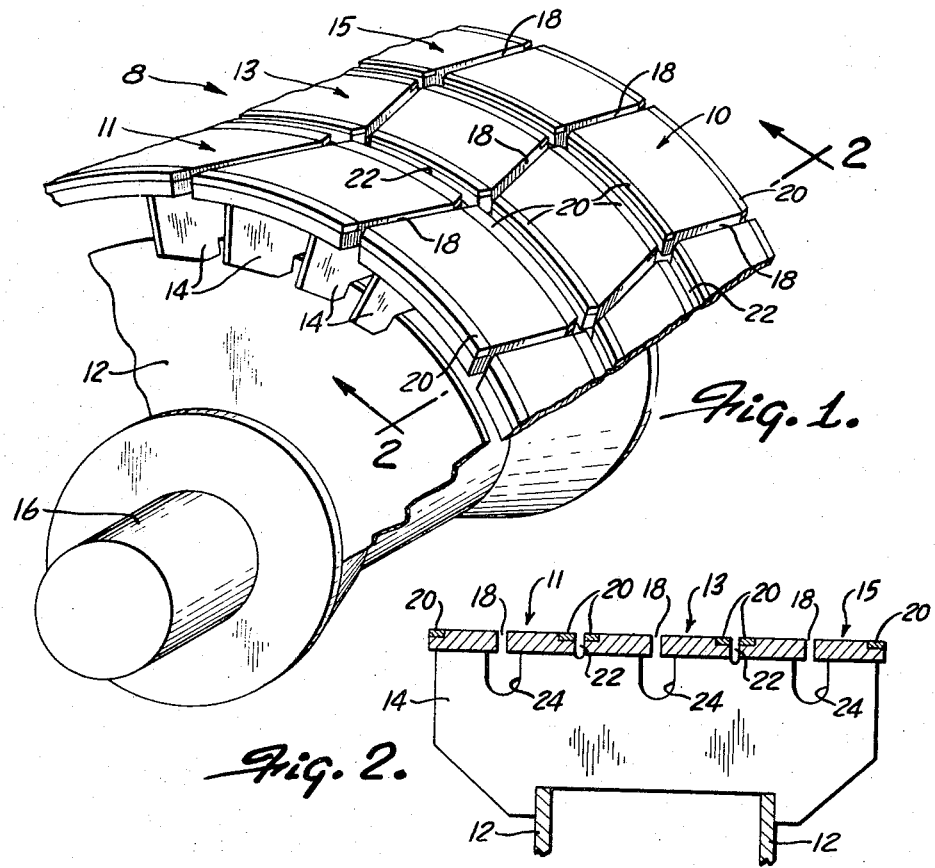
Fig. 1.
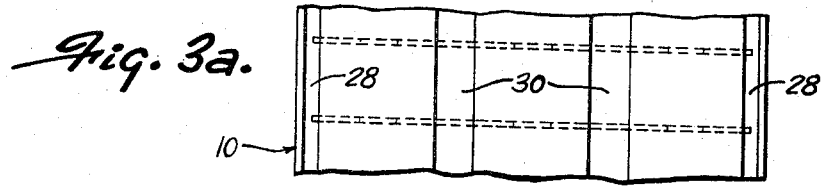
Fig. 2.
Fig. 3a.
Fig. 3b.
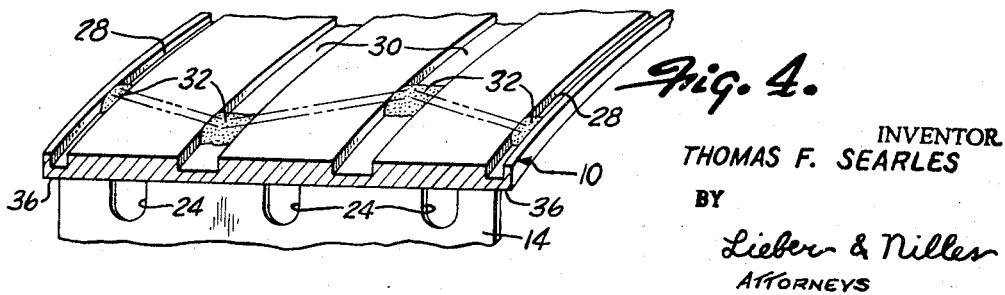
Fig. 4.
INVENTOR
THOMAS F. SEARLES
BY
Lieber & Niller
ATTORNEYS Oct. 31, 1967

PROCESS FOR MANUFACTURING CIRCUMFERENTIALLY SEGMENTED INDUCTION MEMBERS

Filed Oct. 20, 1965

INVENTOR.
THOMAS F. SEARLES
BY
Lieber & Nilles
ATTORNEYS

United States Patent Office 3,349,477
Patented Oct. 31, 1967

3,349,477
PROCESS FOR MANUFACTURING CIRCUMFERENTIALLY SEGMENTED INDUCTION MEMBERS
Thomas F. Searles, New Berlin, Wis., assignor to Harnischfeger Corporation, Milwaukee, Wis., a corporation of Wisconsin
Filed Oct. 20, 1965, Ser. No. 498,455
6 Claims. (Cl. 29—598)

This invention relates to a process for manufacturing a circumferentially segmented induction member having low resistance end rings. Such a member may, for example, be employed to provide a low inertia, high torque rotor for an eddy current clutch.

In many applications of eddy current clutches or brakes, a rotor having a low inertia, and a high torque is required. For example, for clutches in service on cranes or hoists, such a rotor is essential to providing an operating cycle of minimum time duration. In power transmissions which employ eddy current clutches or brakes to shift gears, such a rotor is necessary to insure smooth engagement and disengagement of the gears.

To obtain such low inertia charcteristic, the induction rotor generally comprises a thin walled cylinder affixed to a shaft mounted hub by means of cooling fins. Additionally, axial slots are provided in the thin walled cylinder to permit circumferential and transverse axial expansion of the cylinder without radial expansion of the cylinder. Radial expansion would, of course, if in excess of the air gap of the eddy current clutch or brake, cause the cylinder to strike the field member.

An induction member of high torque, particularly at low slip, i.e., high output speeds, is obtained by the addition of low resistance end rings to the cylinder. These end rings which may be of copper, silver, brass or other low resistance metal serve to increase the magnitude of the eddy currents in the rotor under conditions of low slip. The eddy currents in the cylinder are small at low slip conditions because of the small speed differential between the input and output members of the clutch.

Clutches of large capacity may employ a plurality of the above described rotors mounted on a common shaft in coaxial fashion. The teachings of this invention are equally applicable to eddy current apparatus employing a plurality of cylindrical induction members.

While induction members of the above construction have proved highly desirable, the method of manufacturing such members has been exceedingly expensive and has resulted in poor control of the quality of the completed induction members. In general, this process starts with an iron cylinder of the approximate dimensions of the finished induction member. Circumferential grooves are machined in the iron cylinder at the places where copper rings are desired. The grooves were then filled with copper, generally by welding copper therein. The location of the axial expansion slots were next laid out on the periphery of the cylinder in a skewed pattern to insure smooth running of the induction members. Holes were drilled where the axial slots intersect the copper filled grooves. Additionally, the remaining portions of the copper weld in the path of the slots were removed by grinding or chipping. An air operated chisel was often used for this purpose. The axial expansion slots were then flame cut in the iron cylinder between the holes to form the completed induction member.

The removal of the copper in the grooves, by the drilling of holes, and grinding and peeling, was required because the copper in the groove caused the flame of the cutting tool to be difficult to control and resulted in a poor quality slot and often unwanted cutting into the fins supporting the cylinder. Without removal of the copper the completed induction members were of uncertain quality, difficult to balance, and suffered numerous other defects.

To improve the quality of the induction members by removing the copper was extremely time consuming and hence expensive since the tedious removal of the unwanted copper had to be closely supervised and often done by hand. Even then the copper could not be completely removed as a position of it was in solution with the iron as a result of the welding process.

It is, therefore, an object of this invention to provide a process for manufacturing a circumferentially segmented induction member having low resistance end rings which produces members of consistent high quality.

A further object of this invention is to provide a process of manufacturing such high quality induction members which requires considerably less time and therefore involves less expense than processes heretofore employed.

Specifically, it is an object of this invention to eliminate the step of removing the low resistance metal from the portions of the grooves in the path of the flame cutting torch cutting the axial slots forming the circumferential segments. This eliminates the drilling, grinding, and chipping steps previously required during manufacture of such induction members to remove this metal.

Briefly, the present invention is directed to a process for manufacturing a circumferentially segmented induction member having low resistance end rings from a circumferentially grooved metal cylinder comprising the steps of filling the grooves with a metal having the same flame cutting characteristics as the metal cylinder at points where the axial slots forming the circumferential segments intersects the grooves, filling the remainder of the grooves with a low resistance material, and flame cutting the axial slots in the cylinder to form the circumferential segments. The metal in the grooves in the points where flame cutting occurs insures that satisfactory, uniform flame cutting, is performed along the entire axial length of the cylinder.

The invention, along with other objects and advantages thereof, may be better understood by reference to the following specification and drawings, forming a part thereof, in which:

FIGURE 1 is a fragmentary, perspective view of an induction member constructed in accordance with the method of the present invention;

FIGURE 2 is a detailed view cross sectional of a portion of the rotor shown in FIGURE 1; taken along the line 2—2;

FIGURES 3a and 3b illustrate a cylinder which may be used to form the induction member shown in FIGURES 1 and 2;

FIGURE 4 is a perspective view of the cylinder member of FIGURE 3 subsequent to performing the initial steps of the process of this invention;

Figure 5A:
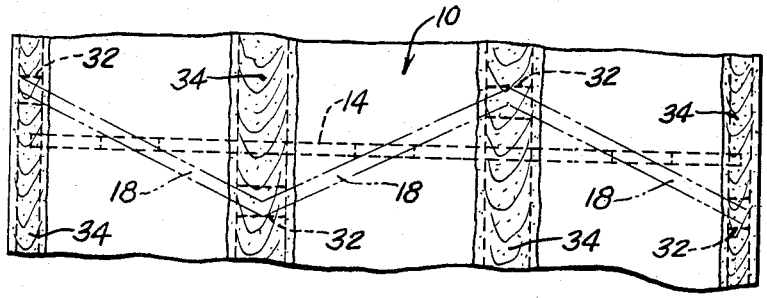
FIGURES 5a and 5b show the cylinder of FIGURE 3 after performance of a subsequent step of the process of this invention.
Figure 5B:
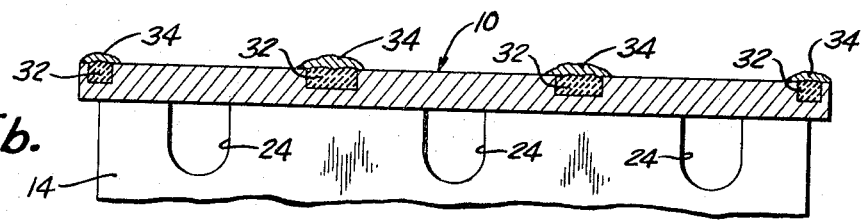
Figure 6:
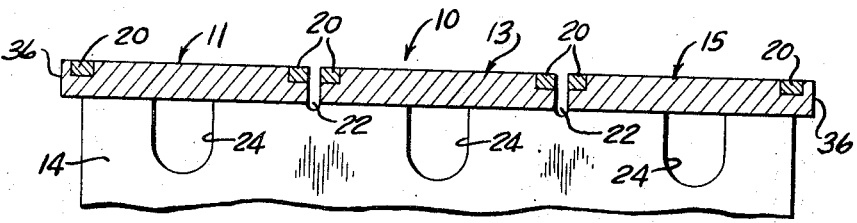
FIGURE 6 shows an additional step in the process of the present invention.

Referring now to the figures, and particularly FIGURE 1, there is shown a portion of an induction member 8 of the type which may be manufactured by the process of the present invention. Induction member 8 consists of a thin walled cylinder 10 having portions 11, 13 and 15 supported on a hub 12 by means of fins 14. Induction member 8 may, for example, be used in an eddy current clutch, in which case hub 12 is mounted on the output shaft 16 of the clutch.

Fins 14 circulate cooling air about the inside of induction member 8. However, the cooling provided by fins 14 is often insufficient to prevent thermal expansion of member 8 in circumferential, radial, and axial directions. To prevent such thermal expansion from interfering with the operation of induction member 8, expansion slots 18 are provided in cylinder 10 to take up the circumferential and axial expansion of the drum and to eliminate radial expansion. These slots may, for example, be 3/32" in width and skewed in relation to the axis of induction member 8 to prevent the slots from passing the poles of the field member simultaneously and causing the member to chatter.

A high output torque, particularly during conditions of low slip is provided by low resistance copper end rings 20 which are located on each end of axial portions 11, 13 and 15.

In induction members having a plurality of coaxial portions, such as portions 11, 13 and 15, the portions may be assembled after the manufacturing process is completed. However, certain efficiencies are introduced if a single iron cylinder corresponding to the approximate dimensions of the completed induction member is used. This member may be cut into a plurality of coaxially aligned portions during the manufacturing process by parting cuts 22 to form the individual portions. Notches 24 in fins 14 permit slots 18 to be cut in a skewed pattern across fins 14 without damaging the fins thereby.

The manufacturing of an induction member 8 as shown in FIGURE 1 begins by assembling a cylinder 10 having dimensions roughly those of the finished inductor member 8 on fins 14, hub 12 and shaft 16. Cylinder 10 may be of low carbon steel or other metal having the desired electrical and magnetic properties. Shaft 16 may be mounted between lathe centers and grooves 28 and 30 cut into cylinder 10 as shown in FIGURE 3. Grooves 28 located at the ends of cylinder 10 are slightly larger in axial dimensions than the desired width of the finished end ring and of a depth corresponding to the desired depth of the end ring. Grooves 30 are of a width corresponding to twice the desired width of the end rings 20 plus the width of parting cut 22. The depth of grooves 30 is that corresponding to the desired depth of end rings 20.

The location of the flame cut expansion slots 18 are then laid out on the surface of cylinder 10.

As the first step of performing the improved process of the present invention, the portions of grooves 28 and 30 wherein expansion slots 18 intersect the grooves are filled with a weld deposit 32 of a metal having the same flame cutting characteristics as cylinder 10. See FIGURE 4. This may, for example, be mild steel. The weld deposit may be approximately one-half inch in width.

After the steel weld deposit has been laid down in the portions of grooves 28 and 30 at which expansion slots 18 intersect the grooves, the entire remaining portion of the groove is filled with a nonmagnetic material 34, such as copper. This may also be done by filling the slots with weld material from a copper rod. At the portions of grooves 28 and 30 in which steel weld 32 is located, copper weld 34 may be overlaid on the steel weld. The inductor member 8 is stress relieved after the above described welding processes are conducted to eliminate any stresses in inductor member 8 produced by such welding.

The partially completed inductor member 8 is then roughly turned so that the copper weld 34 overlying steel weld 32 at the points where expansion slots 18 intersect grooves 28 and 30 along with copper weld 34 lying in the remainder of the aforesaid grooves is machined flush with cylinder 10. Additionally, parting cuts 22 may be made in grooves 30 to separate cylinder 10 into portions 11, 13 and 15.

Expansion slots 18 may then be cut in cylinder 10. This flame cutting may be done quickly, and without danger of gouging or burning fins 14, as the flame cutting proceeds through steel weld 32 in groove 28 across portion 11, through steel weld 32 in groove 30, across portion 13, across the steel weld 32 in the other groove 30, across portion 15, through the steel weld 32 in other groove 28, to the other end of cylinder 26. It will be noted, that at no time does the flame of the cutting torch come in contact with copper weld 34. It is also to be noted, that by the use of steel welds 32 in grooves 28 and 30 the tedious and time consuming steps of removing the copper weld 34 therefrom by drilling, grinding or chipping as required in the prior art process is eliminated.

By way of example, the time which may be saved by employment of the improved process of this invention may be summarized as follows. Under the prior art method, it took approximately 7½ man hours to drill, grind, and chip the copper weld from the grooves 28 and 30 at the points where expansion slots 18 intersected the grooves. The flame cutting of the expansion slots after such removal of the copper weld required 15 man hours for a total of 22½ man hours. In the improved method of the present invention 3 man hours are required to weld steel welds 32 into grooves 28 and 30 before the copper welding and only 2 man hours are required for the flame cutting of expansion slots 18. Thus the time saving through the use of the improved manufacturing process of the present invention is 17½ man hours. The other steps of both the prior art process and the improved process are substantially identical and take substantially identical amounts of time.

Figure 7:
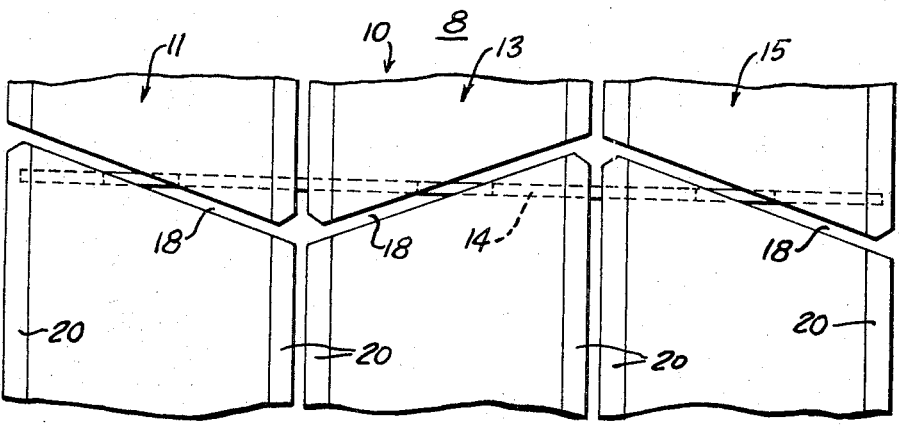
FIGURE 7 shows the final step in the process of the present invention.

Cylinder 10 is converted to a finished inductor member 8 by removing the portions 36 outside grooves 28. This exposes copper welds 34 on the ends of cylinder 26 forming the outer end rings 20. See FIGURE 7. The outer circumference of cylinder 10 is given a final machining to remove any imperfections created by the flame cutting of expansion slots 18.

While the present invention has been demonstrated as a manufacturing method for an induction member for an eddy current clutch, it is to be understood that the advantages obtained by this manufacturing method are not limited solely to the production of such a member. The advantages attained by the present invention may be realized in the production of other apparatus having similar structures. Also, it is appreciated that modifications and variations may be made to the process of the present invention and it is desired to include in the claims below all such modifications and variations as come within the scope of one skilled in the art.

I claim:

1. A process for manufacturing an induction member formed by a metal cylinder and having low resistance end rings, circumferential grooves, and generally axial slots intersecting said grooves to form circumferential segments, comprising the steps of forming circumferential grooves in said cylinder
    filling a portion of said grooves with a metal having the same flame cutting characteristic as said metal cylinder at the locations where the axial slots will intersect said grooves to form said circumferential segments,
    filling the remaining portion of said circumferential grooves with a low resistance material; and
    forming said axial slots by flame cutting said cylinder to form said circumferential segments,
    whereby the metal in said circumferential grooves provides satisfactory flame cutting along the entire length of the cylinder.

2. The process of claim 1 including the step of providing parting cuts in said filled grooves to separate said rotor into a plurality of coaxial portions.

3. The process of claim 1 wherein the steps of filling said grooves is performed by welding.

4. The process of claim 1 further characterized in that ferrous metal is used to fill said grooves at said locations and copper is used to fill the remaining portion of said grooves.

5. The process of claim 4 further characterized in that mild steel is used to fill said grooves.

6. The process of claim 3 further characterized in that during the step of filling the remainder of said grooves with a low resistance material, said material is applied over the top of said metal having the same flame cutting characteristics as said metal cylinder and removed therefrom prior to flame cutting.

References Cited

UNITED STATES PATENTS 2,139,957  12/1938  Inskeep _____ 148—9
2,641,722  6/1953  Jaeschke _____ 310—105

JOHN F. CAMPBELL, *Primary Examiner.*

D. C. REILEY, *Assistant Examiner.*